(12) United States Patent
Aharonov

(10) Patent No.: US 8,307,161 B2
(45) Date of Patent: Nov. 6, 2012

(54) CACHING FOR STRUCTURAL INTEGRITY SCHEMES

(75) Inventor: Arseniy Aharonov, Arad (IL)

(73) Assignee: SanDisk IL Ltd., Kfar Saba (IL)

( * ) Notice: Subject to any disclaimer, the term of this patent is extended or adjusted under 35 U.S.C. 154(b) by 572 days.

(21) Appl. No.: 12/256,111

(22) Filed: Oct. 22, 2008

(65) Prior Publication Data
US 2009/0113136 A1 Apr. 30, 2009

(30) Foreign Application Priority Data
Oct. 30, 2007 (IL) .......................... 187040

(51) Int. Cl.
*H04L 9/00* (2006.01)
(52) U.S. Cl. ........ 711/135; 711/118; 713/157; 713/176; 713/189; 713/193
(58) Field of Classification Search ........................ None
See application file for complete search history.

(56) References Cited

U.S. PATENT DOCUMENTS

| | | | |
|---|---|---|---|
| 6,701,434 B1 | 3/2004 | Rohatgi | |
| 6,711,562 B1 | 3/2004 | Ross et al. | |
| 6,959,384 B1 | 10/2005 | Serret-Avila | |
| 2005/0063545 A1* | 3/2005 | Fujimoto et al. | 380/277 |
| 2006/0080553 A1* | 4/2006 | Hall | 713/189 |
| 2006/0095649 A1 | 5/2006 | Netter et al. | |
| 2006/0107047 A1 | 5/2006 | Bar-El | |
| 2006/0253707 A1* | 11/2006 | Lapstun et al. | 713/176 |
| 2007/0101127 A1 | 5/2007 | Butler et al. | |

FOREIGN PATENT DOCUMENTS

| | | |
|---|---|---|
| EP | 1517214 | 3/2005 |
| GB | 2431741 | 5/2007 |

OTHER PUBLICATIONS

International Search Report and Written Opinion for PCT/IL2008/001385, dated Mar. 5, 2009, 14 pages.
International Preliminary Report on Patentability for PCT/IL2008/001385, dated May 14, 2010, 8 pages.

* cited by examiner

*Primary Examiner* — Yaima Campos
*Assistant Examiner* — Alan Otto
(74) *Attorney, Agent, or Firm* — Brinks Hofer Gilson & Lione

(57) ABSTRACT

A method for data integrity protection includes storing items of data in a plurality of data blocks in a storage medium. Respective block signatures are stored in an integrity structure in the storage medium. A block signature of the given data block is computed in response to a first request to read a first data item from a given data block, and the computed signature is verified against a stored signature read from the integrity structure. The verified block signature is saved in a secure cache. The block signature is recomputed upon receiving a second request to read a second data item, subsequent to the first request, and is verified against the verified block signature in the secure cache. The data item is output from the storage medium in response to verifying the recomputed block signature.

11 Claims, 3 Drawing Sheets

CACHING FOR STRUCTURAL INTEGRITY SCHEMES

FIELD OF THE INVENTION

The present invention relates generally to data storage systems, and specifically to methods and systems for maintaining the integrity of stored data.

BACKGROUND OF THE INVENTION

Structural integrity schemes are used in data storage applications to protect data from being modified without authorization. Such schemes typically use a structure comprising one or more levels of signatures to protect data integrity.

SUMMARY OF THE INVENTION

Various embodiments of a system and method for data integrity protection are possible. An embodiment of a method for data integrity protection may include storing items of data in a plurality of data blocks in a storage medium and storing respective block signatures of the data blocks in an integrity structure in the storage medium. In response to a first request to read a first data item from a given data block, a block signature of the given data block is computed, and the computed signature is verified against a stored signature read from the integrity structure in the storage medium. The verified block signature of the given data block is saved in a secure cache. In response to receiving a second request to read a second data item from the given data block, subsequent to the first request, the block signature of the given data block is recomputed, and the recomputed block signature is verified against the verified block signature in the secure cache. When the recomputed block signature is verified, the second data item is output from the storage medium.

In some embodiments, the integrity structure may include multiple levels of signatures in the storage medium, and at least one of the levels may include an upper level containing one or more upper-level signatures computed over the block signatures. The response to the first request may include computing one or more of the upper-level signatures, and verifying the computed signatures against the stored signatures in all of the levels of the integrity structure. Typically, the multiple levels may include at least three levels, and the integrity structure may include a hierarchy culminating in a top-level block containing a top-level signature computed over the hierarchy.

In one embodiment, the storage medium may include a non-volatile electronic memory, and saving the verified block signature may include maintaining the secure cache in a volatile electronic memory. Verifying the recomputed block signature typically may include comparing the recomputed block signature to the verified block signature in the secure cache without reading the signatures from the integrity structure.

In disclosed embodiments, saving the verified block signature may include saving multiple, respective verified block signatures in entries in the secure cache corresponding to different ones of the data blocks. Saving the verified block signature may include, upon determining that the secure cache is full, flushing an old block signature from the secure cache in order to save the verified block signature in the secure cache. Typically, flushing the old block signature may include selecting the old block signature for flushing in according with a predetermined caching strategy. In one embodiment, this includes choosing a least-recently-used entry for flushing.

Modifying the data stored in the given data block typically may include recomputing the respective block signature of the given data block responsively to the modification and storing the recomputed block signature in the secure cache.

The items of data may be cryptographic secrets.

Another embodiment may provide apparatus for data protection, including a secure cache, a storage medium for storing items of data in a plurality of data blocks, and a storage controller, which is configured to store respective block signatures of the data blocks in an integrity structure in the storage medium. The storage controller may be configured to compute, in response to a first request to read a first data item from a given data block, a block signature of the given data block and to verify the computed signature against a stored signature read from the integrity structure in the storage medium, and to save the verified block signature of the given data block in a secure cache. Upon receiving a second request to read a second data item from the given data block, subsequent to the first request, the storage controller recomputes the new block signature of the given block, verifies the recomputed block signature against the verified block signature in the secure cache, and outputs the second data item from the storage medium responsively to verifying the recomputed block signature.

An additional embodiment may provide a software product, including a machine-readable medium in which program instructions are stored, which instructions, when read by a programmable controller, cause the controller to store items of data in a plurality of data blocks in a storage medium, to store respective block signatures of the data blocks in an integrity structure in the storage medium. The instructions may cause the controller to compute, in response to a first request to read a first data item from a given data block, a block signature of the given data block, and to verify the new block signature against a stored signature read from the integrity structure in the storage medium, and to save the verified block signature in a secure cache, and upon receiving a second request to read a second data item from the given data block, subsequent to the first request, to recompute the new block signature of the given data block and to verify the recomputed block signature against the verified block signature in the secure cache, and to output the second data item from the storage medium responsively to verifying the recomputed block signature.

The present invention will be more fully understood from the following detailed description of the embodiments thereof, taken together with the drawings in which:

DETAILED DESCRIPTION OF EMBODIMENTS

Overview

Figure 1:
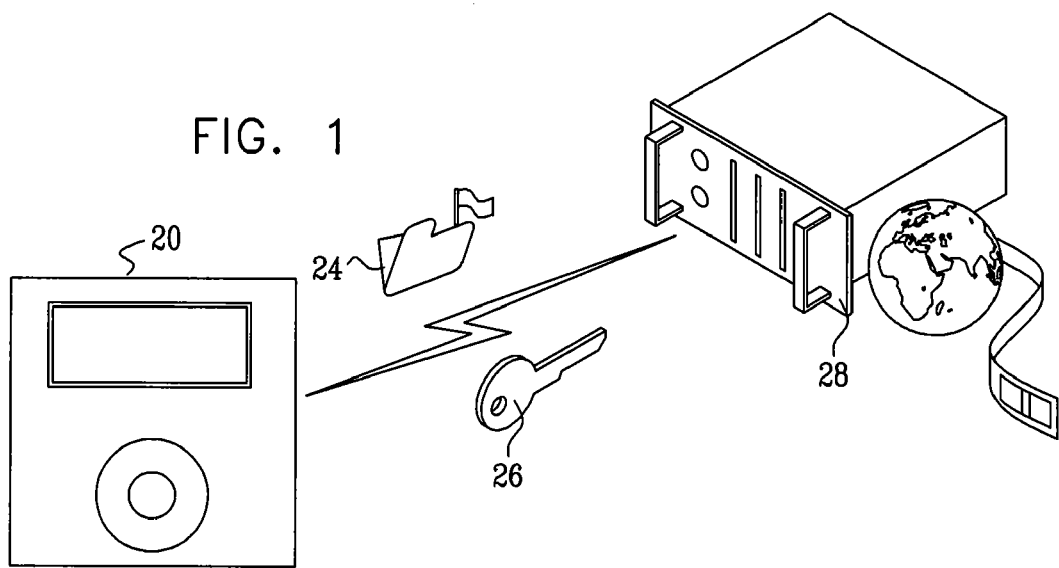
FIG. 1 is a schematic, pictorial illustration of a device for storing data using a hierarchical integrity scheme, in accordance with an embodiment of the present invention.

Secure data storage systems often use signatures to provide integrity protection. In the context of the present patent application and in the claims, the term "signature" is used broadly to refer to any code that is calculated over an element of data and may subsequently be used to verify that the data element has not changed since the code was calculated. There are many types of signatures utilized in secure data storage systems. These include, but are not limited to—MAC, hash, CRC, PGP, and PKI:

- A cryptographic message authentication code (MAC) is a short piece of information used to authenticate a message.
- A cryptographic hash function is a transformation that takes an input and returns a fixed-size string, which is called the hash value.
- A cyclic redundancy check (CRC) is a type of function that takes as input a data stream of any length and produces as output a value of a certain fixed size.
- Pretty Good Privacy (PGP) encryption uses public-key cryptography and includes a system which binds public keys to a user name.
- A public key infrastructure (PKI) is an arrangement that binds public keys with respective user identities by means of a certificate authority.

In some hierarchical data integrity schemes, a digital signature is created for each data item being stored and is updated when any data is added or changed. An upper-level signature is computed over the signatures of the data items to protect the integrity of the signatures, and the upper-level signatures may themselves be protected by one or more levels of super-signatures, in a hierarchical manner, up to the top-level signature, which verifies the integrity of the entire data structure.

Reading data from this type of secure data storage architecture has a significant drawback, especially in devices that use embedded or flash memory. Each attempt to read an item of data is preceded by reading a set of signature values, beginning with the data block signature and progressing iteratively, upward through the hierarchy, to the top-level signature. If these signatures do not match the expected values calculated in the verification process, it is determined that the integrity of the data structure has been compromised and therefore the data item is not retrieved. This integrity verification process can take a significant amount of overhead, adding to the amount of time that it takes to read data from secure data storage.

Embodiments of the present invention provide methods for enhancing the performance of reading data from secure data storage. Some embodiments described below use a novel signature caching scheme that reduces the number of times the storage medium must be accessed in verifying the integrity of the data structure over multiple read operations. Thus, this method decreases the number of read operations required to verify the integrity of the data structure.

When the first request to read a data item from a given block is received, a new block signature is computed and verified against the signatures in all levels of the secure storage structure. Next, the verified block signature is stored in a secure memory cache. When a subsequent request to read a data item from the same block is received, the new block signature is computed and is verified against the verified block signature for the data item in the secure memory cache. The ability to verify data item integrity against a secure cache with a single read operation eliminates the need to perform multiple read operations to obtain the relevant set of signature values from the secure data storage for verification purposes. Caching verified block signatures thus provides a significant decrease in the amount of time necessary to read a data item from secure data storage structures.

System Description

FIG. 1 is a schematic, pictorial illustration of a media player device 20 that uses a hierarchical integrity scheme for secure data storage, in accordance with an embodiment of the present invention. Device 20 downloads an encrypted media file 24 from a media server 28 or other source. In order to decrypt and play the media file, device 20 must also download an associated cryptographic secret, in the form of a secret key 26, from server 28. Key 26 itself is typically downloaded to device 20 in a form that is inaccessible to the user of the device. Therefore, the user is unable to change, duplicate, or make any other unauthorized use of the key. Optionally, for enhanced security, the keys themselves may be stored in the device in encrypted form.

Media file 24 and key 26 are stored in memory in device 20. Typically, device 20 stores many different media files, each with its own unique key. In order to prevent unauthorized access to and use of the keys (and hence of the media files), the keys are arranged in a secure hierarchical integrity structure in the memory of device 20. This structure, as described in detail below with reference to FIG. 3, contains the keys along with multiple levels of signatures. When the user of device 20 attempts to access a given media file, the device checks the signatures that apply to the key for the file in order to verify that the key is authentic and has not been tampered with or copied illegally. After verifying the key in this manner, the device uses the key to decrypt and play the media file.

The embodiment shown in FIG. 1 presents one application of the present invention solely by way of example and for the purpose of illustration only. The principles of the present invention may be used in any storage system that requires data integrity. Although the described embodiment uses a hierarchical integrity scheme, other structural integrity schemes may benefit similarly from the caching technique that is described herein. The data secured by the integrity scheme may comprise cryptographic secrets, as in the present example, or any other type of sensitive data.

Figure 2:
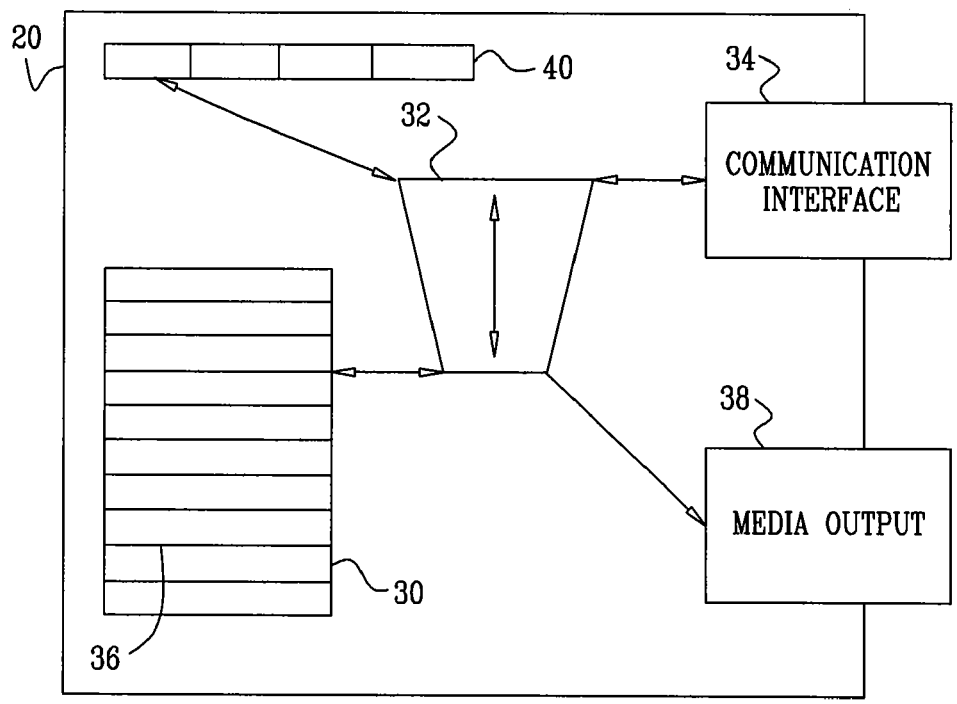
FIG. 2 is a block diagram that schematically illustrates internal details of the device of FIG. 1, in accordance with an embodiment of the present invention.

FIG. 2 is a block diagram that schematically illustrates internal details of device 20, in accordance with an embodiment of the present invention. An interface 34 passes data from an external source to a storage controller 32. As explained above, the data may include both media files and associated secret keys. Storage controller 32 stores the data in a storage medium, such as a flash memory 30. Flash memory is non-volatile, which means that it does not need power to maintain the information stored in the memory. Memory 30 is divided into access units, i.e., groups of memory cells that are written to and read from in a single write or read operation. In flash memory, the access unit is a page 36, which typically comprises between 512 and 2048 Kb.

Controller 32 is typically a programmable processing device, which operates under the control of program instructions that are stored in a machine-readable medium, such as flash memory 30 or other electronic memory, or in magnetic or optical media. The instructions cause the controller to perform the data integrity-related functions that are described herein. Alternatively or additionally, some or all of the functions of the controller may be performed by dedicated processing logic.

Figure 3:
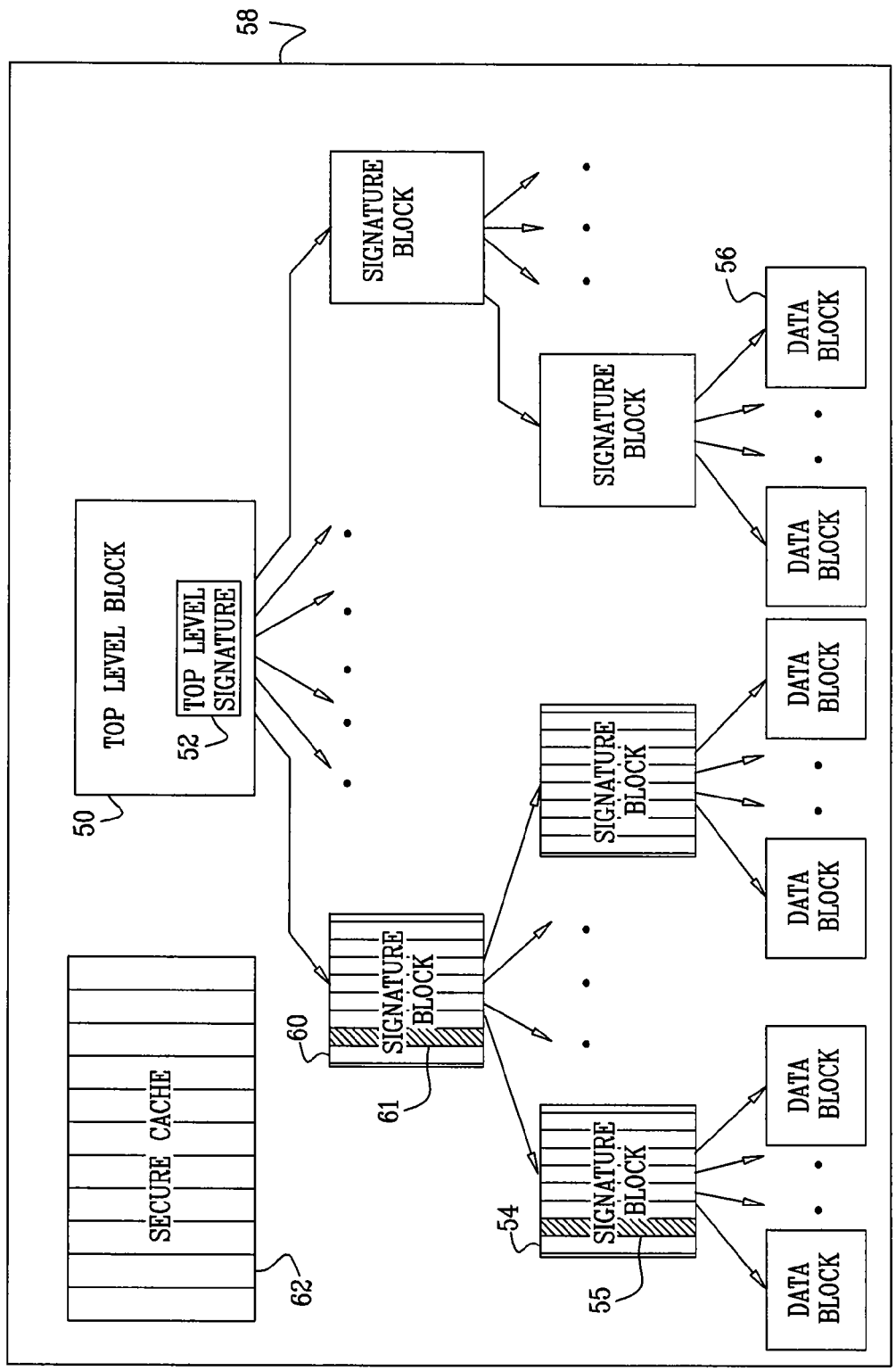
FIG. 3 is a diagram that schematically illustrates a data structure used to store and cache data with hierarchical integrity, in accordance with an embodiment of the present invention.

Typically, controller 32 stores the media files and secret keys in different, respective locations in flash memory 30. The keys are stored as data items in data blocks in a hierarchical integrity structure, as shown in FIG. 3. Each block may hold a single data item, or multiple data items may be grouped together in one or more of the blocks.

Controller 32 computes a signature over each block, as well as upper-level signatures, to form a hierarchical integrity structure as shown below in FIG. 3. This structure is stored in flash memory 30. When the user of device 20 first asks to play a particular media file, the controller reads the page containing the key from the memory and checks the block signature and upper-level signatures against the signature values that are stored in the flash memory. If the values of the signatures match, the controller uses key 26 (FIG. 1) to decrypt the media file and transfers the decrypted file to a media output 38, such as an audio speaker, for playback.

The controller stores the validated block signature corresponding to the key in a secure cache in random access memory (RAM) 40. Random access memory is a form of volatile memory, and loses the stored information when not electrically powered. The cache in this case is secure because in order to tamper with the contents of flash memory 30, an attacker must typically disconnect power from device 20, whereupon signatures cached in the RAM are erased. Alternatively, controller 32 may store the secure cache in other types of attack-resistant cache memories, as are known in the art.

The next time the user of device 20 asks to play a particular media file, controller 32 reads the page containing the key from memory 30 and checks the block signature against the validated block signature for that key in RAM 40. If the computed block signature is found in the secure cache, and the computed and verified signatures match, the controller uses the key to decrypt the media file and transfers the decrypted file to the media output for playback. If the calculated block signature is not found in the secure cache, the upper-level signatures are read and are checked against the calculated signature values. If the signature values do not match, the controller determines that the integrity of the signature has been corrupted and returns a failure message.

Although the present embodiment is described with reference to flash memory, the same principles apply to other types of storage media, including magnetic and optical, as well as electronic, memory:

Magnetic storage refers to the storage of data on a magnetized medium, such as a magnetic hard disk. Magnetic storage uses different patterns of magnetization in a magnetizable material to store data and is another form of non-volatile memory.

One form of optical storage uses tiny pits etched on the surface of a circular disc to store information. This information is read by illuminating the surface with a laser diode and observing the reflection. Optical disc storage is a form of non-volatile memory.

One form of electronic memory is random access memory (RAM). It loses the stored information when not electrically powered and is a form of volatile memory. Other types of programmable electronic memory are non-volatile, like flash memory.

Each of these types of storage media is characterized by access units of a particular size, such as blocks or tracks on a disk.

Structural Integrity Caching Scheme

FIG. 3 is a diagram that schematically illustrates a data structure 58 used by controller 32 to store data in memory 30 (FIG. 2) with hierarchical integrity, in accordance with an embodiment of the present invention. As explained above, cryptographic secrets (such as key 26) are stored in data blocks 56. Each block may hold a single data item, or multiple data items may be grouped within the data blocks.

Each data block is signed by the controller (FIG. 2) with a single block signature 55. The controller may compute the signatures using any suitable method known in the art, such as the MAC, hash, CRC, PGP, or PKI types of computations mentioned above. These block signatures constitute the lowest signature-level in structure 58. The block signatures themselves are grouped in signature blocks 54. These signature blocks are arranged in an integrity structure comprising multiple levels of signatures, including at least one upper level containing one or more upper-level signatures computed over the block signatures.

In the example shown in FIG. 3, each signature block 54 is itself protected by an upper-level signature 61 computed by the controller over the signature(s) in the lower-level signature block. The upper-level signatures are grouped in upper-level signature blocks 60, which constitute the next signature level in the integrity hierarchy.

The integrity hierarchy culminates in a top-level signature block 50, which typically contains the upper-level signatures of upper-level signature blocks 60. The controller computes a top-level signature 52 over the upper-level signature(s) of all of blocks 60, and thus protects the integrity of the whole data structure, including the data blocks and the signatures. The hierarchical structure that is shown in FIG. 3 is just one example of an integrity structure that may be used in this system. Although the hierarchy in structure 58 is shown, by way of example, as comprising three levels of signature blocks 54, 60 and 50, the principles of the present invention may be applied to all integrity structures having any practical number of levels, one or greater.

Data structure 58 also comprises a secure cache 62, which may be stored in RAM 40 (FIG. 2) and holds block signatures 55 that have already been verified, as explained above. The use of this secure cache in relation to the hierarchy of data and signature blocks in flash memory 30 is described hereinbelow.

Figure 4:
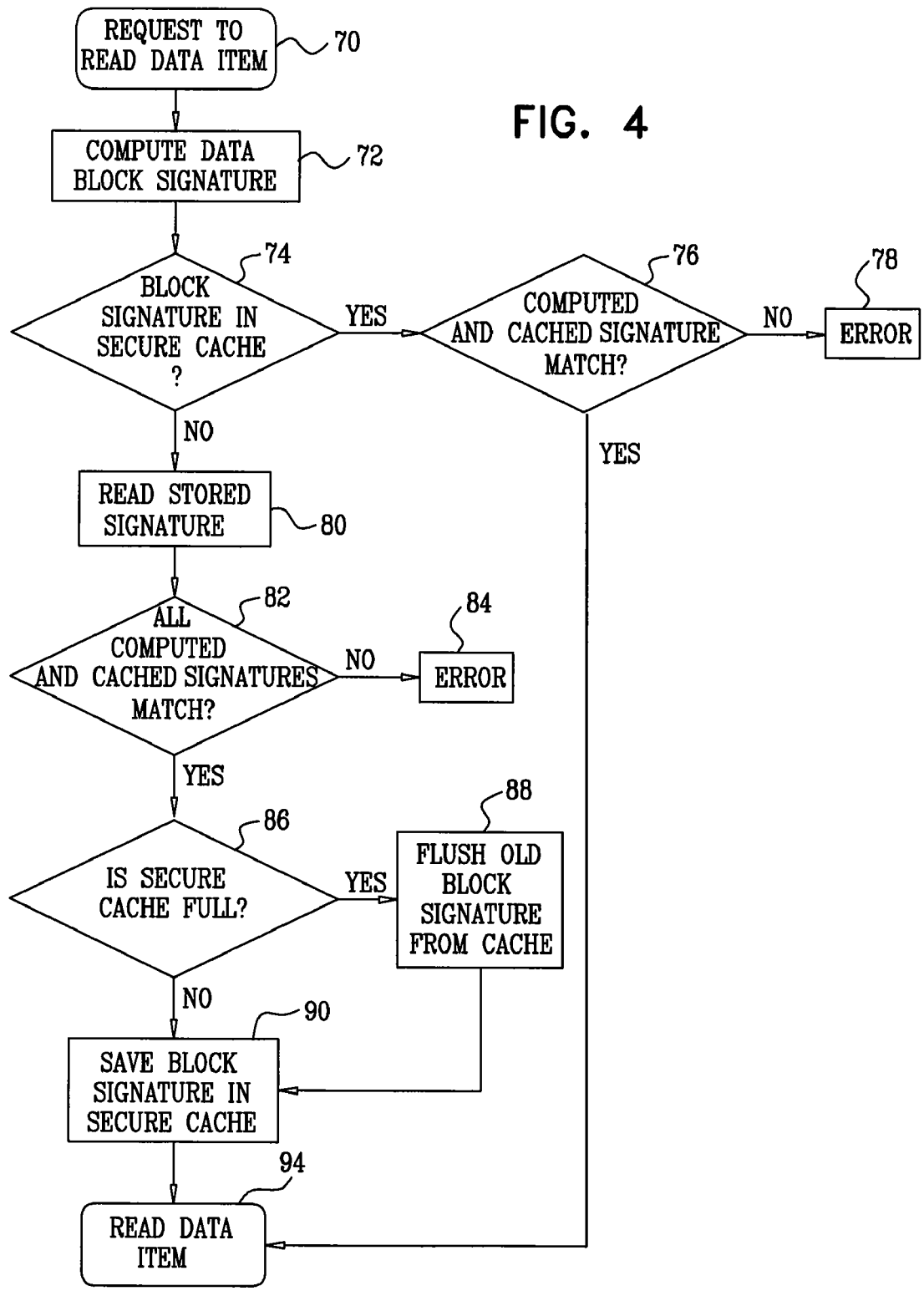
FIG. 4 is a flow chart that schematically illustrates a method for reading data, in accordance with an embodiment of the present invention.

FIG. 4 is a flow chart that schematically illustrates a method for reading data from integrity data structure 58 (FIG. 3), in accordance with an embodiment of the present invention. The process begins at an initial step 70, whenever controller 32 (FIG. 2) receives a request to read a data item (such as key 26) from a certain data block 56 in secure storage in flash memory 30. The controller computes the data block signature over the requested data block, at a signature calculation step 72.

Controller checks whether block signature 55 for the requested data block is found in secure cache 62, at a cache checking step 74. The controller compares the computed and cached block signatures for the requested data block, in a signature comparison step 76. If the two block signatures match, the controller reads out the data item, at a readout step 94. In the case of media player device 20 (FIG. 1), for example, the controller may use the data item (key 26) to decrypt and play the corresponding media file 24. If the values do not match, the controller may conclude that the data integrity has been compromised, raising an error condition in a failure step 78 and taking appropriate action.

If the block signature is not found in the secure cache at step 74, controller 32 reads the signatures stored in all of the appropriate levels of the structure 58, in a signature readout step 80. The controller computes and compares the appropriate signature values over the requested data block and the upper levels of the hierarchy iteratively, upward through the hierarchy to the top-level signature, in a multi-signature comparison step 82. Thus, for example, assuming a data item is to be read from the leftmost data block 56 in the hierarchy, the controller performs the following computations:

- Compare the data block signature computed at step 72 to signature 55 in the leftmost signature block 54.
- Compute a value for of the upper-level signature of signature block 54, including signature 55, and compare the value to upper-level signature 61 stored in the leftmost upper-level block 60.
- Compute an upper-level signature value over the value of upper-level signature 61 together with the previously-computed values of the other upper-level signatures in the leftmost upper-level block 60, and compare the value to the corresponding signature stored in top-level block 50.
- Compute a new top-level signature value over this upper-level signature together with the previously-computed values of the signatures of the other upper-level blocks, and compare the value to the stored top-level signature 52.

If any of the values do not match at step 82, the controller may conclude that the data integrity has been compromised, raising an error condition in an error step 84 and taking appropriate action.

If all of the computed signatures match their stored values at step 82, the controller determines whether there is free space available in secure cache 62, at a cache checking step 86. If there is space available in the cache, the controller saves the verified block signature 55 in the cache, at a signature caching step 90. As a result, the next time a data item is requested from this same data block, the controller will find the signature block signature in the cache at step 74, and will thus avoid the delay of steps 80 and 82. This caching strategy is particularly effective when related data items (such as keys of media files with songs by the same artist, for example) are stored together in the same block. The controller then reads the data item at step 94.

If controller 32 determines at step 86 that the secure cache is full, it flushes an old block signature entry from the secure cache in a flushing step 88. It then saves verified block signature 55 in the secure cache at step 90 and reads the data item at step 94. The controller may use any suitable strategy in deciding what signature to flush. For example, each cache entry may have a timestamp, which is refreshed each time the controller accesses the entry. The controller may thus choose to flush the least-recently-used entry at step 88. Alternatively or additionally, data blocks 56 may be prioritized, giving higher priority to the blocks to which rapid access is desired. When the cache is full, the controller will then flush signatures of lower-priority blocks in favor of higher-priority blocks.

If one or more of the data items in data block 56 are changed, or a new data item is added to the data block, the corresponding block signature 55 must be recomputed. The new block signature is stored in block 54, and the corresponding upper-level signatures are recomputed and updated in structure 58, as well. If block signature 55 was held in cache 62 prior to the change, then controller 32 also saves the updated block signature in the cache.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for data integrity protection, comprising:
   storing items of data in a plurality of data blocks in a storage medium, wherein each data block has a priority indicative of the degree to which rapid access to the data block is desired;
   storing respective block signatures of the data blocks in an integrity structure in the storage medium, wherein a block signature of a data block comprises code that is calculated based on data of the data block at the time of calculation of the block signature;
   in response to a first request to read a first data item from a given data block, computing a block signature of the given data block, and verifying the computed signature against a stored signature read from the integrity structure in the storage medium;
   saving the verified block signature of the given data block in a secure cache, wherein the saving the verified block signature comprises:
     determining whether the secure cache is full;
     responsively to determining that the secure cache is full, determining the priority of the given data block, and flushing from the secure cache a block signature of a data block having a lower priority than the priority of the given data block;
   upon receiving a second request to read a second data item from the given data block, subsequent to the first request, recomputing the block signature of the given data block and verifying the recomputed block signature against the verified block signature in the secure cache; and
   outputting the second data item from the storage medium responsively to verifying the recomputed block signature.

2. The method according to claim 1, wherein the integrity structure comprises multiple levels of signatures in the storage medium, wherein at least one of the levels is an upper level containing one or more upper-level signatures computed over the block signatures, and
   wherein the method comprises, in response to the first request, computing one or more of the upper-level signatures, and verifying the computed signatures against the stored signatures in all of the levels of the integrity structure.

3. The method according to claim 2, wherein the multiple levels comprises at least three levels, and wherein the integrity structure comprises a hierarchy culminating in a top-level block containing a top-level signature computed over the hierarchy.

4. The method according to claim 1, wherein in the storage medium comprises a non-volatile electronic memory, and wherein saving the verified block signature comprises maintaining the secure cache in a volatile electronic memory.

5. The method according to claim 1, wherein verifying the recomputed block signature comprises comparing the recomputed block signature to the verified block signature in the secure cache without reading the signatures from the integrity structure.

6. The method according to claim 1, wherein saving the verified block signature comprises saving multiple, respective verified block signatures in entries in the secure cache corresponding to different ones of the data blocks.

7. The method according to claim 1, and comprising making a modification in the data stored in the given data block, recomputing the respective block signature of the given data block responsively to the modification, and storing the recomputed block signature in the secure cache.

8. The method according to claim 1, wherein the items of data comprise cryptographic secrets.

9. A method for data integrity protection, comprising:
storing items of data in a plurality of data blocks in a storage medium, wherein each data block has a priority indicative of the degree to which rapid access to the data block is desired;
storing respective block signatures of the data blocks in an integrity structure in the storage medium, wherein a block signature of a data block comprises code that is calculated based on data of the data block at the time of calculation of the block signature;
computing, by a storage controller, in response to a first request to read a first data item from a given data block, a block signature of the data block;
verifying, by the storage controller, the computed signature against a stored signature read from the integrity structure in the storage medium;
saving, by the storage controller, the verified block signature of the given data block in a secure cache, wherein the saving the verified block signature comprises:
determining whether the secure cache is full; and
responsively to determining that the secure cache is full, determining the priority of the given data block, and flushing from the secure cache a block signature of a data block having a lower priority than the priority of the given data block;
upon receiving a second request to read a second data item from the given data block, subsequent to the first request, recomputing, by the storage controller, the new block signature of the given data block and verifying, by the storage controller, the recomputed block signature against the verified block signature in the secure cache; and
outputting, by the storage controller, the second data item from the storage medium, in response to verifying the recomputed block signature.

10. The method of claim 9, wherein the second data item is outputted for use with playing media files on a media player device.

11. The method of claim 1, wherein the second data item is outputted for use with playing media files on a media player device.

* * * * *

UNITED STATES PATENT AND TRADEMARK OFFICE
CERTIFICATE OF CORRECTION

| | | |
|---|---|---|
| PATENT NO. | : 8,307,161 B2 | Page 1 of 1 |
| APPLICATION NO. | : 12/256111 | |
| DATED | : November 6, 2012 | |
| INVENTOR(S) | : Aharonov | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 695 days.

Signed and Sealed this
Twenty-sixth Day of August, 2014

Michelle K. Lee
*Deputy Director of the United States Patent and Trademark Office*